(12) United States Patent
Rao et al.

(10) Patent No.: US 10,363,825 B2
(45) Date of Patent: Jul. 30, 2019

(54) METHOD, BATTERY MANAGEMENT SYSTEM AND VEHICLE FOR CHARGING AWAKENING

(71) Applicant: Borgward Trademark Holdings GmbH, Stuttgart (DE)

(72) Inventors: Hang Rao, Stuttgart (DE); Zhongmin Wang, Stuttgart (DE)

(73) Assignee: BORGWARD TRADEMARK HOLDINGS GMBH, Stuttgart (DE)

( * ) Notice: Subject to any disclaimer, the term of this patent is extended or adjusted under 35 U.S.C. 154(b) by 66 days.

(21) Appl. No.: 15/596,047

(22) Filed: May 16, 2017

(65) Prior Publication Data
US 2018/0208066 A1  Jul. 26, 2018

(30) Foreign Application Priority Data
Jan. 26, 2017  (DE) ......................... 10 2017 000 714

(51) Int. Cl.
*H02J 7/00* (2006.01)
*B60L 11/18* (2006.01)
(Continued)

(52) U.S. Cl.
CPC ............. *B60L 11/1816* (2013.01); *B60L 3/00* (2013.01); *B60L 53/14* (2019.02); *B60L 53/60* (2019.02);
(Continued)

(58) Field of Classification Search
CPC .................................................. B60L 11/1816
(Continued)

(56) References Cited

U.S. PATENT DOCUMENTS

| 6,331,762 B1 | 12/2001 | Bertness |
| 2004/0051498 A1 | 3/2004 | Kim |

(Continued)

FOREIGN PATENT DOCUMENTS

| CN | 101834459 | 9/2010 |
| CN | 102496991 | 6/2012 |

(Continued)

OTHER PUBLICATIONS

Office Action in corresponding Chinese Application No. 201611162045. 4, dated Mar. 11, 2019, 5 pages.

*Primary Examiner* — Suresh Memula
(74) *Attorney, Agent, or Firm* — Tucker Ellis LLP (57) ABSTRACT

The present invention relates to a method, a battery management system and a vehicle for charging awakening. The battery management system includes a wake-up module, used for generating a wake-up signal when the battery management system is in a dormant or power-off state and an external charging plug is connected with a charging interface; and a power management module, used for conducting a power supply circuit between a battery module and a preset function module in the battery management system when receiving the wake-up signal. According to the system for charging wake-up provided by the present invention, the battery management system is automatically woken up when the external charging plug is accessed to charge the vehicle, so the battery management system automatically enters a normal working state from the power-off state or the dormant state.

14 Claims, 9 Drawing Sheets

(51) Int. Cl.
  *B60L 3/00*   (2019.01)
  *B60L 53/14*  (2019.01)
  *B60L 53/60*  (2019.01)
  *B60L 58/10*  (2019.01)
  *H02J 9/00*       (2006.01)

(52) U.S. Cl.
  CPC ............ *B60L 58/10* (2019.02); *H02J 7/0036* (2013.01); *H02J 7/0047* (2013.01); *B60L 2250/10* (2013.01); *B60L 2250/16* (2013.01); *H02J 9/005* (2013.01); *H02J 2007/005* (2013.01); *Y02T 10/7005* (2013.01)

(58) Field of Classification Search
  USPC ......................................................... 320/109
  See application file for complete search history.

(56) References Cited

U.S. PATENT DOCUMENTS

2017/0182893 A1* 6/2017 Hayashizaki ............. B60L 3/00
2018/0062150 A1* 3/2018 Kim ....................... H01M 2/348

FOREIGN PATENT DOCUMENTS

| CN | 204517449    | 7/2015  |
|----|--------------|---------|
| CN | 204557082    | 8/2015  |
| CN | 105365593 A  | 3/2016  |
| CN | 205544400    | 8/2016  |
| CN | 106114255 A  | 11/2016 |
| JP | 2004-248406 A | 9/2004 |
| KR | 10-2009-0046474 | 5/2009 |
| KR | 10-2014-020659 | 2/2014 |

\* cited by examiner

METHOD, BATTERY MANAGEMENT SYSTEM AND VEHICLE FOR CHARGING AWAKENING

RELATED APPLICATION DATA

The present application claims priority to German Patent Application No. 102017000714.4, filed Jan. 26, 2017, the disclosure of which is incorporated herein by reference in its entirety.

FIELD OF THE INVENTION

The present invention relates to the technical field of battery management, and in particular to a method, a battery management system and a vehicle for charging awakening.

BACKGROUND OF THE INVENTION

A battery management system (BMS) is a key technology in battery management of an electric vehicle. It plays an important role in management and monitoring the state of a battery pack of the electric vehicle, and carries out charging and discharging management on the battery pack while monitoring the dump energy of the battery pack. When the vehicle is stalled, the battery management system is in a power-off state, namely a battery module and a power management module of the battery management system do not supply power to function modules of the battery management system, therefore when the vehicle is charged, the battery management system needs to be woken up at first to cause the same to enter a working state, that is, the power management module of the battery management system supplies power to the function modules of the battery management system.

In related technology, the battery management system in the power-off state is woken up by way of vehicle ignition, which makes the charging process become cumbersome and brings inconvenience for operation of users.

SUMMARY OF THE INVENTION

To solve the problems in related technology, according to one aspect of the present invention, a battery management system is provided. The system includes: a wake-up module, used for generating a wake-up signal when the battery management system is in a dormant or power-off state and an external charging plug is connected with a charging interface; and a power management module, used for conducting a power supply circuit between a battery module and a preset function module in the battery management system when receiving the wake-up signal.

Optionally, the system further includes: a detection module, used for detecting a connection state of the external charging plug and the charging interface; and a control module, used for generating a fault prompt signal and/or a preset control signal when the connection state is abnormal.

Optionally, the detection module is further used for obtaining a voltage value across the external charging plug and the charging interface; and the control module is used for determining a resistance value across the external charging plug and the charging interface according to the voltage value, and matching the resistance value with a preset resistance value to judge whether the connection state is abnormal or not.

Optionally, the system further includes: a switching module, used for generating a control signal when a preset function switching signal sent by the control module is received, wherein the control signal is used for controlling a detection process of the detection module; and the control module is further used for generating the preset function switching signal and sending the preset function switching signal to the switching module, when the power supply circuit between the battery module and preset function module in the battery management system is conducted.

According to a second aspect of the present invention, a circuit for charging wake-up is provided, including: a wake-up module, respectively connected with a power management module of a battery management system and a charging interface and used for generating a wake-up signal, which is used for making the power management module conduct a power supply circuit between a battery module and a preset function module in the battery management system, when the battery management system is in a dormant or power-off state and an external charging plug is connected with the charging interface.

Optionally, the circuit further includes: a detection module, respectively connected with the charging interface and a control module of the battery management system and is used for detecting a connection state of the external charging plug and the charging interface, so that the control module generates a fault prompt signal and/or a preset control signal when the connection state is abnormal.

Optionally, the circuit further includes: a switching module, respectively connected with the wake-up module and the control module and is used for generating a control signal when a preset function switching signal sent by the control module is received to control a detection process of the detection module.

Optionally, the detection module includes: a detection resistor R3, wherein one end of the detection resistor R3 is connected with the control module, and the other end of the detection resistor R3 is connected with the charging interface.

Optionally, the wake-up module includes: a MOS transistor Q1, a resistor R1, a resistor R2 and a diode D1; a source of the MOS transistor Q1 is connected with a positive electrode of the battery module, a drain of the MOS transistor Q1 is connected with the power management module, and a gate of the MOS transistor Q1 is connected with the positive electrode of the diode D1 through the resistor R2; a negative electrode of the diode D1 is connected with the charging interface; and one end of the resistor R1 is respectively connected with the source of the MOS transistor Q1 and the positive electrode of the battery module, and the other end of the resistor R1 is connected with the gate of the MOS transistor Q1.

Optionally, the switching module includes: a triode Q2 and a resistor R4; a base of the triode Q2 is connected with the control module, a collector of the triode Q2 is connected with the positive electrode of the diode D1, and an emitter of the triode Q2 is grounded; and one end of the resistor R4 is respectively connected with a switching signal source and the base of the triode Q2, and the other end of the resistor R4 is connected with the emitter of the triode Q2.

Optionally, the switching module includes: a relay; and a first input end of the relay is connected with the positive electrode of the battery module, a second input end of the relay is connected with a switching signal source, a first output end of the relay is connected with the wake-up module, and a second output end of the relay is grounded.

Optionally, the first input end of the relay is connected with the first output end of the relay, when the second input end of the relay does not receive the preset function switching signal sent by the control module.

Optionally, the wake-up module includes: a MOS transistor Q3, a resistor R5 and a resistor R6; the source of the MOS transistor Q3 is connected with the first output end of the relay, the drain of the MOS transistor Q3 is connected with the power management module, and the gate of the MOS transistor Q3 is connected with the charging interface through the resistor R6; and one end of the resistor R5 is respectively connected with the first output end of the relay and the source of the MOS transistor Q3, and the other end of the resistor R5 is connected with the gate of the MOS transistor Q3.

According to a third aspect of the present invention, a vehicle is provided, including the aforementioned battery management system.

According to a fourth aspect of the present invention, a vehicle is provided, including the aforementioned circuit for charging wake-up.

According to a fifth aspect of the present invention, a method for charging awakening is provided, including: generating a wake-up signal when a battery management system is in a dormant or power-off state and an external charging plug is connected with a charging interface; and conducting a power supply circuit between a battery module and a preset function module in the battery management system according to the wake-up signal.

Optionally, the method further includes: detecting a connection state of the external charging plug and the charging interface; and generating a fault prompt signal and/or a preset control signal when the connection state is abnormal.

Optionally, the step, detecting a connection state of the external charging plug and the charging interface, includes: obtaining a voltage value across the external charging plug and the charging interface; determining a resistance value across the external charging plug and the charging interface according to the voltage value; and matching the resistance value with a preset resistance value to judge whether the connection state is abnormal.

Optionally, the method further includes: generating a control signal according to a received preset function switching signal, wherein the control signal is used for controlling a detection process of the connection state of the external charging plug and the charging interface.

Optionally, the method further includes: obtaining charge quantity of the battery pack in real time, when the power supply circuit between the battery module and the preset function module is conducted and external power supply equipment charges a battery pack of a vehicle; and sending the charge quantity to a display module to be displayed.

Optionally, the method further includes: sending a prompt message to a configured target terminal, when the charge quantity exceeds a preset threshold.

Optionally, the method further includes: controlling the control module to enter a low power consumption working state, when the charge quantity reaches the preset electric quantity threshold.

By means of the aforementioned technical solutions, the battery management system is automatically woken up when the external charging plug is accessed to charge the vehicle, so the battery management system automatically enters a normal working state from the power-off state or the dormant state, and a user does not need to wake up the battery management system by way of ignition, thereby simplifying the charging process of the vehicle, facilitating the operation of the user and improving the user experience.

Other features and advantages of the present invention will be described in detail in subsequent specific embodiments.

BRIEF DESCRIPTION OF THE DRAWINGS

The accompanying drawings are used for providing a further understanding of the present invention, constitute a part of the specification, are used for explaining the present invention together with the following specific embodiments, rather than limitations to the present invention. In the accompanying drawings.

DETAILED DESCRIPTION OF THE EMBODIMENTS

Hereinafter, specific embodiments of the present invention will be described below in detail in combination with the accompanying drawings. It should be understood that the specific embodiments described herein are merely used for illustrating and explaining the present invention rather than limiting the present invention.

Figure 1:
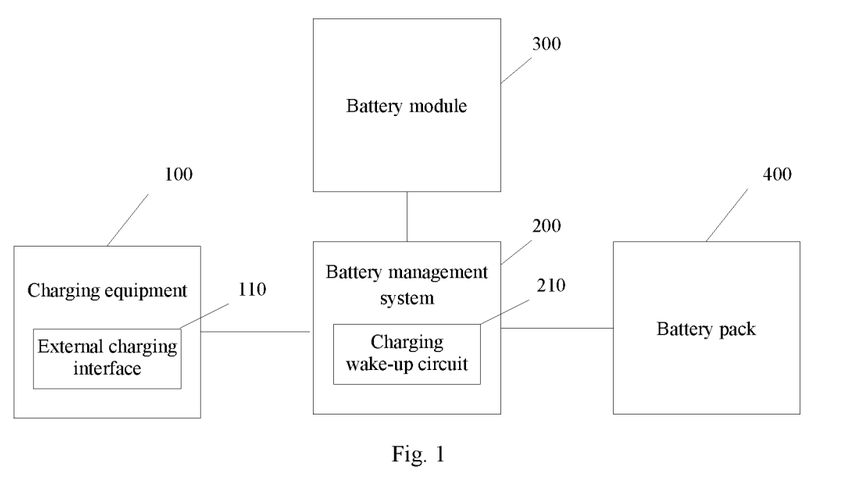
FIG. 1 is a structural schematic diagram of a vehicle charging system shown according to an exemplary embodiment.

FIG. 1 is a structural schematic diagram of a vehicle charging system shown according to an exemplary embodiment. As shown in FIG. 1, a battery management system 200 is in a dormant or power-off state when a vehicle is shut down, and at this time, a power supply equipment 100 can charge a battery pack 400 of the vehicle by an external charging plug 110. When the power supply equipment 100 is connected with the battery management system 200 by the external charging plug 110, a circuit for charging wake-up 210 in the battery management system 200 can activate the battery management system 200 in the dormant or power-off state, namely conduct a power supply circuit between a battery module 300 (e.g., a storage battery) and a related function module in the battery management system 200, so that the battery management system 200 enter a working state to monitor and manage the state of the battery pack 400.

In the present invention, the power-off state of the battery management system refers to the power-off state in which there is no key in the vehicle. The no-key power-off state can be divided into two situations: one situation is for a traditional key starting system, a key is not inserted in a key hole of the vehicle, the vehicle is in a stalled state at the moment, and the battery management system is in the power-off state; and the other situation is for a vehicle started without the key, the vehicle does not detect the key inserted by a user or the user does not press a starting function button on the vehicle, the vehicle is in the stalled state at the moment, and the battery management system is in the power-off state.

FIG. 2 to FIG. 5 show structural schematic diagrams of a battery management system shown according to an exemplary embodiment. The battery management system 200 includes a wake-up module 211, a power management module 212, a detection module 213, a switching module 214 and a control module 215. The wake-up module 211, the detection module 213 and the switching module 214 form a circuit for charging wake-up of the present invention.

The wake-up module 211 is respectively connected with the power management module 212 and a charging interface and is used for generating a wake-up signal, which is used for enabling the power management module 212 to conduct a power supply circuit between a battery module 300 and a preset function module in the battery management system, when the battery management system 200 is in a dormant or power-off state and the charging interface is connected with an external charging plug 110 of power supply equipment 100. In the embodiment of the present invention, for example, the preset function module can include, but not limited to the control module 215, the detection module 213 and the switching module 214.

The power management module 212 is connected with the wake-up module 211 and is used for supplying power to the other modules of the battery management system 200 when receiving the wake-up signal.

The detection module 213 is respectively connected with the charging interface and the control module 215 and is used for detecting a connection state of the external charging plug 110 and the charging interface. In one embodiment of the present invention, the detection module 213 obtains a voltage value across the external charging plug 110 and the charging interface in a detection process, the control module 215 is connected with the detection module 213 and is used for determining a resistance value across the external charging plug 110 and the charging interface according to the voltage value, and matching the resistance value with a preset resistance value to judge whether the connection state of the external charging plug 110 and the charging interface is abnormal. A fault prompt signal and/or a preset control signal is generated when the connection state of the external charging plug and the charging interface is abnormal. In one embodiment of the present invention, for example, the form of the fault prompt signal can be, but not limited to: sound, vibration, lamplight, text displayed on a display screen, or any combination of the previous four forms. The preset control signal is used for controlling related function modules in the battery management system 200 to avoid the occurrence of charging accidents.

The switching module 214 is respectively connected with the wake-up module 211 and the control module 215 and is used for generating a control signal when a preset function switching signal sent by the control module 215 is received, wherein the control signal is used for controlling the detection process of the detection module 213.

Figure 2:
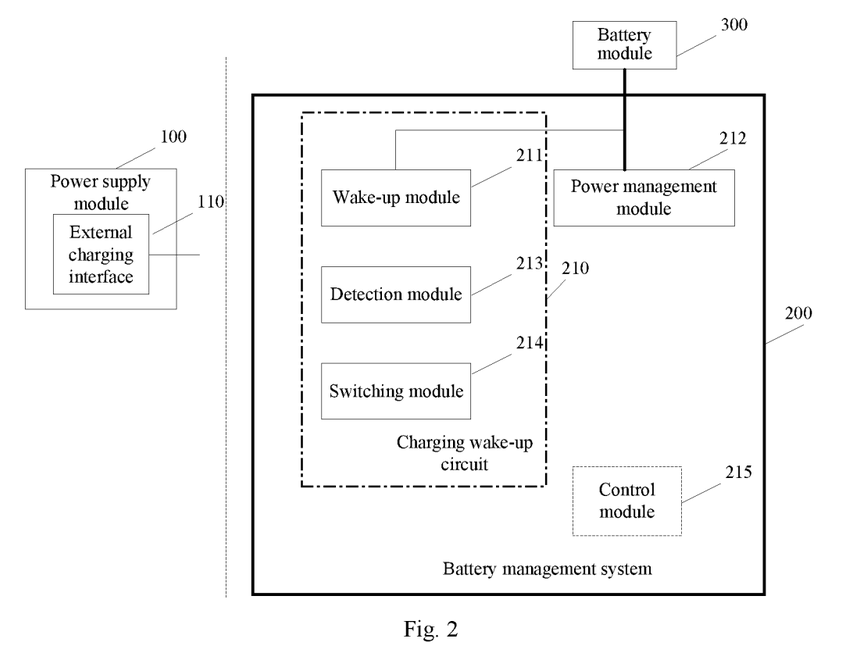
FIG. 2 is a structural schematic diagram of a battery management system in a dormant or power-off state shown according to an exemplary embodiment.
Figure 3:
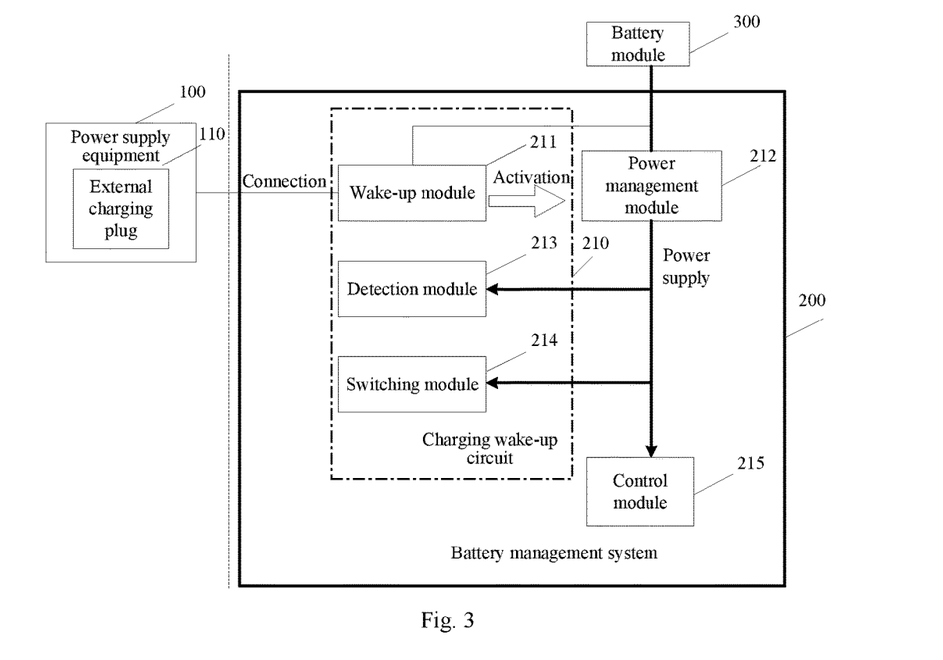
FIG. 3 is a structural schematic diagram of a battery management system shown according to an exemplary embodiment at a working stage of a wake-up module.

As shown in FIG. 2, the battery management system 200 is in the power-off state when the vehicle is in the stalled state. If the power supply equipment 100 is not connected with the charging interface of the vehicle through the external charging plug 110, the wake-up module 211 and the power management module 212 are in a non-working state, and the battery module 300 cannot supply power to the preset function module in the battery management system 200 through the power management module 212. As shown in FIG. 3, after the external charging plug 100 is connected with the wake-up module 211 of the battery management system 200 through the external charging plug 110, the wake-up module 211 enters a working state at the moment, namely the wake-up module 211 sends the wake-up signal to the power management module 212, so that the power management module 212 connects the battery module 300 with the modules of the battery management system 200 after receiving the wake-up signal, and the battery module 300 can supply power to the preset function module (e.g., the control module 215, the detection module 213 and the switching module 214) in the battery management system 200 through the power management module 212 at the moment.

The above stage in which the work-up module works is a stage in which the battery management system is activated. At the stage, the wake-up module 211 keeps a normal working state. The working state of the wake-up module 211 isn't influenced by the detection module 213 and the switching module 214, so that the detection module 213 and the switching module 214 can be either in normal working states or in abnormal working states.

Figure 4:
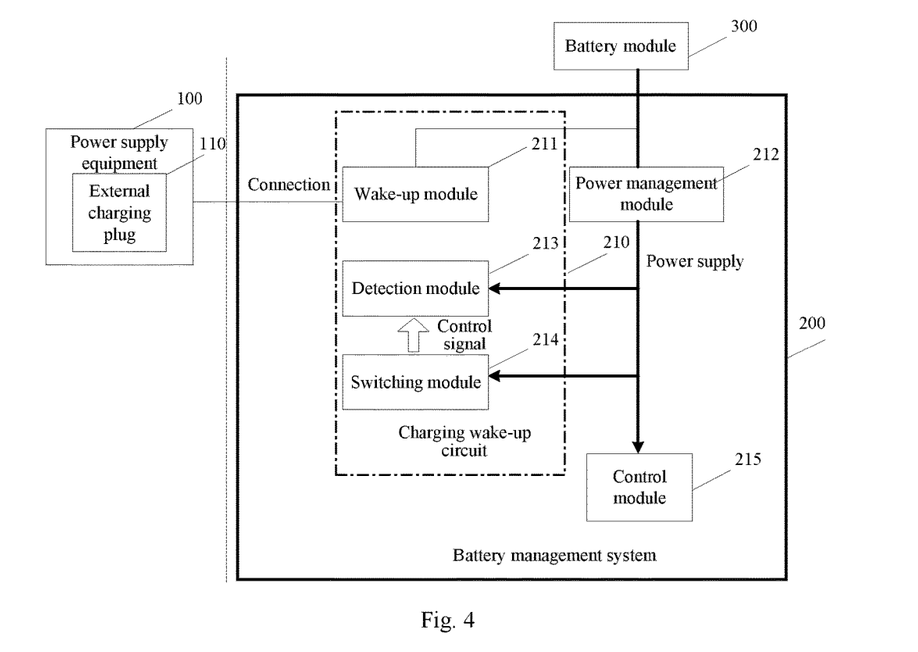
FIG. 4 is a structural schematic diagram of a battery management system shown according to an exemplary embodiment at a working stage of a switching module.

As shown in FIG. 4, after the modules of the battery management system 200 are powered on, the control module 215 enters the working state, namely the control module 215 provides a reference voltage necessary for detection for the detection module 213, receives a detection result sent by the detection module 213 and makes corresponding response according to the detection result.

Since the wake-up module 211 will influence the detection result of the detection module 213, the influence of the wake-up module 211 on the detection module 213 needs to be eliminated by the switching module 214. Namely the control module 215 sends the preset function switching signal to the switching module 214. The switching module 214 generates a control signal according to the preset function switching signal sent by the control module 215, and the control signal can be used for controlling the detection process of the detection module 213 so as to enable the detection module 213 to work normally and eliminate the influence of the wake-up module 211 on the detection result of the detection module 213.

In the embodiment of the present invention, the control module 215 can send the switching signal to the switching module 214 immediately or after a preset time intervals when the power management module 212 is activated. The switching module 214 can control the detection module 213 to work normally by a hardware design or a combined mode of hardware and software.

In addition, in a stage when the control module 215 controls the switching module 214, the battery management system 200 has been activated, and the wake-up module 211 has accomplished its work, so that the wake-up module 211 can be either in the normal working state or in the abnormal working state.

Figure 5:
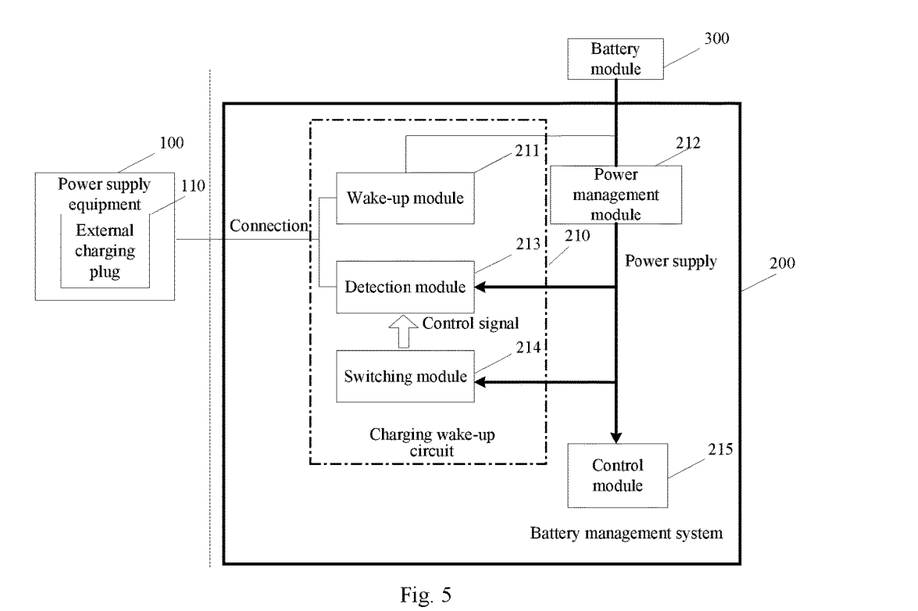
FIG. 5 is a schematic diagram of a module structure of a battery management system shown according to an exemplary embodiment at a normal working stage of a detection module.

As shown in FIG. 5, after the detection module 213 enters the normal working state, the detection module 213 starts to detect the connection state of the external charging plug 110 and sends the detection result to the control module 215. The control module 215 matches with the preset value according to the received detection result. In one embodiment of the present invention, the detection module 213 can obtain the voltage value across the external charging plug 110 and the charging interface and send the voltage value to the control module 215. The control module 215 determines the resistance value across the external charging plug 110 and the charging interface according to the voltage value, and matches the resistance value with the preset resistance value to judge whether the connection state of the external charging plug 110 and the charging interface is abnormal. If the connection state of the external charging plug 110 and the charging interface is abnormal, the control module 215 can execute related operations, for example, send the fault prompt signal and/or the preset control signal. In one embodiment of the present invention, for example, the form of the fault prompt signal can be, but not limited to: sound, vibration, lamplight, text displayed on a display screen, or any combination of the previous four forms. The preset control signal is used for controlling related function modules in the battery management system 200 to avoid charging problems.

Correspondingly, the present invention further provides a vehicle, including the aforementioned battery management system.

Figure 6:
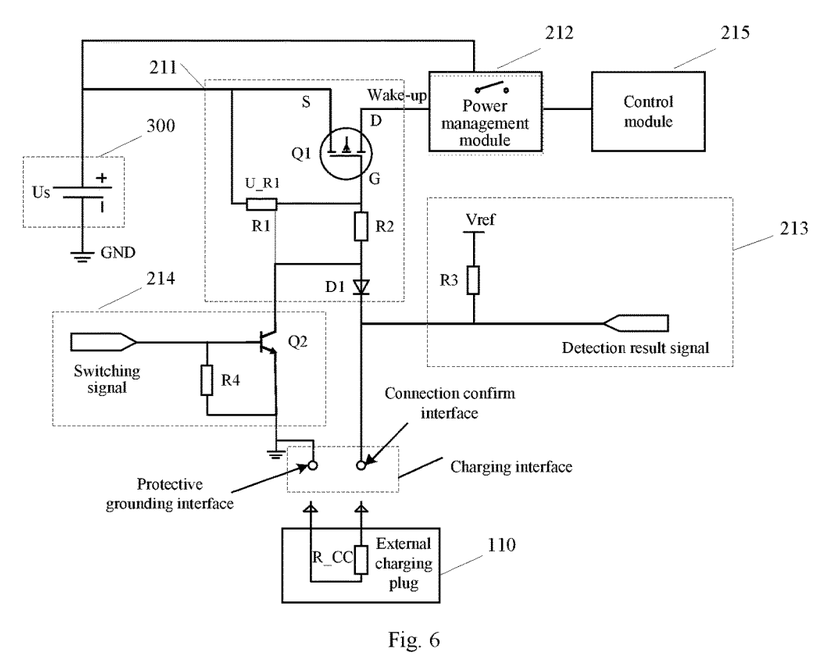
FIG. 6 is a structural schematic diagram of a circuit for charging wake-up shown according to an exemplary embodiment.

FIG. 6 is a structural schematic diagram of a circuit for charging wake-up shown according to an exemplary embodiment. As shown in FIG. 6, in the embodiment, the circuit for charging wake-up includes the wake-up module 211, the detection module 213 and the switching module 214. The wake-up module 211 specifically includes: a MOS transistor Q1, a resistor R1, a resistor R2 and a diode D1. A source of the MOS transistor Q1 is connected with a positive electrode of the battery module 300, a drain of the MOS transistor Q1 is connected with the power management module, and a gate of the MOS transistor Q1 is connected with the positive electrode of the diode D1 through the resistor R2; a negative electrode of the diode D1 is connected with the charging interface; and one end of the resistor R1 is respectively connected with the source of the MOS transistor Q1 and the positive electrode of the battery module 300, and the other end of the resistor R1 is connected with the gate of the MOS transistor Q1. In the embodiment, the MOS transistor Q1 can be a P channel field effect transistor.

The power management module 212 can turn on the power supply circuit between the battery module 300 and the preset function module (e.g., the detection module 213, the switching module 214 and the control module 215) in the battery management system, when the wake-up signal from the wake-up module 211 is received. In addition, the power management module 212 is further connected with the positive electrode of the battery module 300 to protect the battery management system.

The detection module 213 specifically includes: a detection resistor R3. One end of the detection resistor R3 is connected with the control module 215, the control module 215 provides a reference voltage Vref necessary for detection, and the other end of the detection resistor R3 is connected with the charging interface.

In the embodiment, the charging interface can include a connection confirm interface and a protective grounding interface, wherein the protective grounding interface is grounded. The external charging plug is also provided with the connection confirm interface and the protective grounding interface therein, and a resistor R_CC is connected between the connection confirm interface and the protective grounding interface. When the external charging plug 110 is connected with the charging interface, one end of the resistor R_CC is connected with the connection confirm interface of the charging interface, and the other end of the resistor R_CC is connected with the protective grounding interface. The resistor R_CC and the detection resistor R3 form a voltage division circuit, namely the reference voltage Vref output by the control module 215 is grounded by the detection resistor R3 and the resistor R_CC.

The detection module 213 is used for obtaining the voltage value across the connection confirm interface in the charging interface and a ground wire. The control module 215 obtains the resistance value across the connection confirm interface of the external charging plug and the ground wire according to the voltage value across the connection confirm interface and the ground wire, and matches the resistance value with the preset resistance value. For vehicle plugs with different specifications, the resistance values of the resistor R_CC across the connection confirm interface and the protective grounding interface are different. When the charging interface is connected with the resistor R_CC, the resistance values of the resistor R_CC across the connection confirm interface and the protective grounding interface are different, and the control module 215 is preset with the resistance values of the resistors R_CC in all types of external charging plugs. If the resistance value of the resistor R_CC accessed to the connection confirm interface is matched with the built-in resistance value, the connection state of the of the external charging plug 110 and the charging interface is normal; and on the contrary, if the connection state of the of the external charging plug 110 and the charging interface is unconnected or abnormal, and the control module 215 can send the fault prompt signal and/or the preset control signal when it is detected the connection state is abnormal. The form of the fault prompt signal can be, but not limited to: sound, vibration, lamplight, text displayed on a display screen, or any combination of the previous four forms. The preset control signal is used for controlling related function modules in the battery management system to avoid the occurrence of charging accidents.

In another embodiment of the present invention, the preset detection resistor can also be the detection resistor R3 in the detection module 213. The detection module 213 can also obtain the resistance value of the resistor R_CC in the external charging plug 110 according to the voltage of the detection resistor R3 and the reference voltage Vref. The process that the control module 215 judges the connection state of the external charging plug 110 and the charging interface according to the match of the resistance value of the resistor R_CC is the same as the matching process in the aforementioned embodiment, and thus will not be illustrated in detail herein.

The switching module 214 specifically includes: a triode Q2. A base of the triode Q2 is grounded by a resistor R4, a collector thereof is connected with the positive electrode of the diode D1, and an emitter thereof is grounded. One end of the resistor R4 is respectively connected with a switching signal source and the base of the triode Q2, and the other end of the resistor R4 is connected with the emitter of the triode Q2. In the embodiment, the triode Q2 is an NPN type triode. In an embodiment of the present invention, the switching signal source is the control module 215 or a hardware circuit, so the switching signal can be generated by the control module 215 or the hardware circuit.

When the battery management system is in the power-off state and the external charging plug 110 is not connected with the charging interface, the power management module 212 is not conducted, the battery module 300 cannot supply power to the control module 215, therefore the control module 215 outputs no signal to the switching module 214 and does not provide the reference voltage for the detection module 213, the triode Q2 is in a cut-off state, the reference voltage Vref has no power supply and is in an open circuit or high impedance state, and a detection point of the detection module 213 is in high impedance state as well.

At this time, very small current or no current flows by the resistor R1, so the voltage difference of left and right ends of the resistor R1 is very small, which is much smaller than the voltage Vsg necessary for conducting the MOS transistor Q1 (the P channel field effect transistor). Therefore, the MOS transistor Q1 is not conducted, the drain thereof has no voltage, and thus the wake-up signal for conducting the power management module 212 cannot be output.

When the external charging plug 110 is connected with the connection confirm interface of the charging interface and the external charging plug is connected with the protective grounding interface of the charging interface, the positive electrode of the battery module 300 is grounded by the resistor R1, the resistor R2 and the diode D1 of the wake-up module 211 and the resistor R_CC of the external charging plug 110 (i.e., the negative electrode of the battery module 300) to form a loop. In the loop, current flows by the resistor R1, and the voltage difference U_R1 across the two ends of the resistor R1 is as shown in formula (1).

$$U\_R1=(Us-U\_D1)\times R1/(R1+R2+R\_CC) \tag{1}$$

U_R1 represents a voltage across the two ends of the resistor R1; Us represents an output voltage of the battery module 300 and is 12V or 24V in general; U_D1 represents the voltage difference across the two ends of the diode D1 and is about 0.7V; R1 represents the resistance value of the resistor R1; R2 represents the resistance value of the resistor R2; and R_CC represents the resistance value of the resistor R_CC.

The voltage difference U_R1 across the two ends of the resistor R1 can be adjusted by selecting the resistor R1 and the resistor R2. When the voltage difference U_R1 is greater than the voltage Vsg necessary for conducting the MOS transistor Q1, the MOS transistor Q1 is conducted, the drain voltage thereof is equal to the source voltage Us, and the wake-up signal of the wake-up module 211 is input to the power management module 212 at this time; and the power management module 212 starts to supply power to the other modules of the battery management system after receiving the wake-up signal, therefore the battery module 300 can supply power to the modules of the battery management system through the power management module 212, and the battery management system is woken up.

In a wake-up process of the battery management system, the wake-up module 211 keeps the normal working state, and the detection module 213 and the switching module 214 can be either in the normal working states or in the non-working states, as long as their working states generate no influence on the function of the wake-up module 211.

After the battery management system is woken up, the control module 215 can control the switching module 214 and provide the reference voltage for the detection module 213.

Assuming that the preset detection resistor is the resistor R_CC of the external charging plug 110, the voltage across the two ends of the preset detection resistor R_CC is as shown in formula (2) at the moment.

$$U\_CC=Vref\times R\_CC/(R3+R\_CC) \tag{2}$$

U_CC represents the voltage across the two ends of the preset detection resistor; Vref represents the reference voltage; R3 represents the resistance value of the detection resistor R3; and R_CC represents the resistance value of the preset detection resistor R_CC.

Therefore, the resistance value of the resistor R_CC in the external charging plug can be obtained according to the voltage value across the two ends of the preset detection resistor R_CC, the resistance value of the detection resistor R3 and the reference voltage Vref (e.g., 5V), so that the connection state of the external charging plug and the connection confirm interface of the charging interface can be detected.

However, since the wake-up module 211 will influence the detection result of the detection module 213, that is, the positive electrode of the battery module 300 arrives at a detection connection point of the detection module 213 through the resistor R1, the resistor R2 and the diode D1 in the wake-up module 211, flows to the GND (ground) through the resistor R_CC in the external charging plug 110 and will also flow to the input of the reference voltage through the detection resistor R3, so that the voltage U_CC actually detected by the detection module 213 is inconsistent with the result of the formula (2), and thus the formula (2) is not applicable anymore.

Therefore, after the battery management system is activated, the control module 215 needs to control the switching module 214, namely outputs the preset function switching signal to conduct the triode Q2 (PNP type), then the resistor R2 is connected with the ground through the triode Q2 directly, and the voltage of a connection point across the resistor R2 and the positive electrode of the diode D1 is close to 0V. Further, since the resistance value of the resistor R_CC of the external charging plug 110 is about 100Ω to 3.6 kΩ it can be seen from the formula (2) that U_CC is greater than or equal to 0.5V. Since the diode D1 has unidirectional conduction performance, only when the voltage of the positive electrode of the diode D1 is about 0.7V higher than that of the negative electrode, the diode D1 can be conducted. Since the voltage of the positive electrode of the diode D1 is close to 0V, which is smaller than the voltage (about 1.2V) necessary for conduction thereof, the diode D1 is in the cut-off state and is close to an open circuit, that is, no current in the wake-up module 211 flows by the diode D1, and thus no influence will be generated on the detection result of the detection module 213.

After the battery management system is activated, the wake-up module 211 has accomplished its work, so that the wake-up module 211 can be either in the normal working state or in the abnormal working state at the moment.

Figure 7:
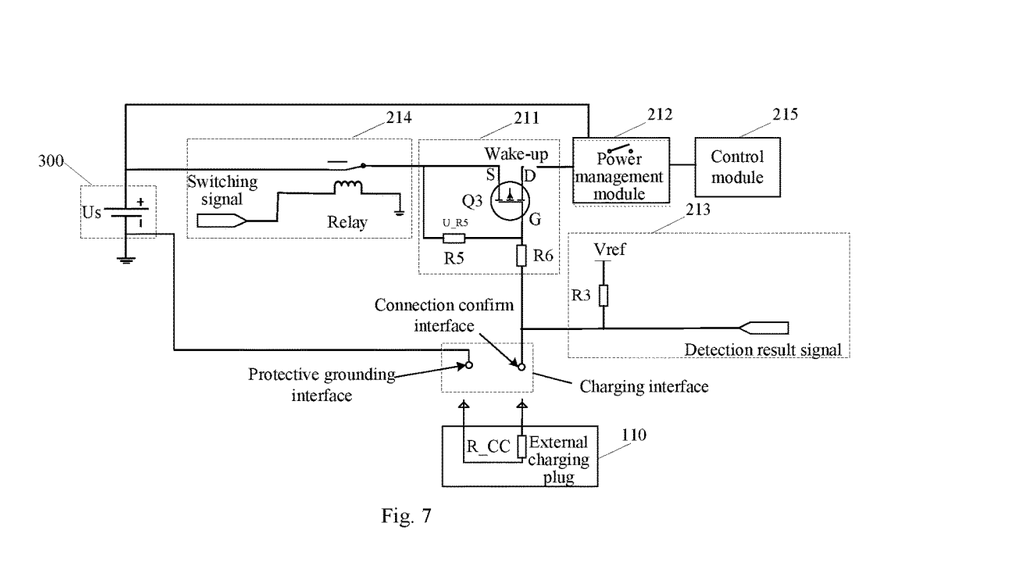
FIG. 7 is a structural schematic diagram of a circuit for charging wake-up shown according to another exemplary embodiment.

FIG. 7 is a structural schematic diagram of a circuit for charging wake-up shown according to another exemplary embodiment. As shown in FIG. 7, the difference between the circuit for charging wake-up shown in the embodiment and the circuit for charging wake-up as shown in FIG. 6 lies in that the triode Q2 of the switching module 214 of the circuit for charging wake-up in the embodiment is replaced by a relay, and the wake-up module 211 includes a resistor R5, a resistor R6 and a MOS transistor Q3.

The detection module 213 and the power management module 212 shown in FIG. 7 are the same as the detection module 213 and the power management module 212 respectively shown in FIG. 6.

A first input end of the relay is connected with the positive electrode of the battery module, a second input end of the relay is connected with the switching signal source, a first output end of the relay is connected with the wake-up module, and a second output end of the relay is grounded. In the embodiment of the present invention, the relay is in a normally closed state, that is, when the second input end of the relay does not receive the preset function switching signal sent by the control module 215, the first input end thereof is connected with the first output end.

The source of the MOS transistor Q3 in the wake-up module 211 is connected with the first output end of the relay, the drain of the MOS transistor Q3 is connected with the power management module 212, and the gate of the MOS transistor Q3 is connected with the connection confirm interface through the resistor R6. One end of the resistor R5 is respectively connected with the source of the MOS transistor Q3 and the positive electrode of the battery module, and the other end of the resistor R5 is connected with the gate of the MOS transistor Q3.

When the battery management system is in the power-off state and the external charging plug 110 is not connected with the charging interface, the power management module 212 is disconnected, and the battery module 300 cannot supply power to the modules of the battery management system, so the control module 215 outputs no signal to the switching module 214 and does not supply the reference voltage to the detection module 213. The relay is in a closed state, the source of the MOS transistor Q3 is connected with the positive electrode of a storage battery, namely the source voltage of the MOS transistor Q1 is equal to the voltage of the storage battery, the input end of the reference voltage Vref is in the open circuit or the high impendence state, and the detection point of the detection module 213 is also in the high impendence state as well.

At this time, very small current or no current flows by the resistor R5, so the voltage difference across the two ends of the resistor R5 is very small, which is much smaller than the voltage Vsg necessary for conducting the MOS transistor Q3 (the P channel field effect transistor). Therefore, the MOS transistor Q3 is not conducted, the drain thereof has no voltage, and thus the wake-up signal for conducting the power management module 212 cannot be output.

When the external charging plug 110 is connected with the connection confirm interface of the charging interface and the external charging plug is connected with the protective grounding interface of the charging interface, the positive electrode of the battery module 300 is connected with the ground (i.e., the negative electrode of the battery module 300) via the resistor R5 of the wake-up module 211, the resistor R6 of the wake-up module 211 and the resistor R_CC of the external charging plug 110 to form a loop. In the loop, current flows by the resistor R5, and the voltage difference U_R5 across the two ends of the resistor R5, is as shown in formula (3).

$$U\_R5 = Us \times R5/(R5+R6+R\_CC) \quad (3)$$

U_R5 represents a voltage across the two ends of resistor R5; Us represents the output voltage of the battery module and is 12V or 24V in general; R5 represents the resistance value of the resistor R5; R6 represents the resistance value of the resistor R6; and R_CC represents the resistance value of the resistor R_CC.

The voltage difference U_R5 across the two ends of the resistor R5 can be adjusted by the resistance values of the resistor R5 and the resistor R6. When the voltage difference U_R5 is greater than the voltage Vsg necessary for conducting the MOS transistor Q3, the MOS transistor Q3 is conducted, the drain voltage thereof is equal to the source voltage Us, and the wake-up signal of the wake-up module 211 is input to the power management module 212 at this time; and the power management module 212 starts to supply power to the other function modules of the battery management system after receiving the wake-up signal, therefore the battery module 300 can supply power to the modules of the battery management system through the power management module 212, and the battery management system is woken up.

In the wake-up process of the battery management system, the wake-up module 211 keeps the normal working state, and the detection module 213 and the switching module 214 can be either in the normal working states or in the non-working states, as long as their working states generate no influence on the function of the wake-up module 211.

After the battery management system is woken up, the control module 215 can control the switching module 214 and provide the reference voltage for the detection module 213.

Assuming that the preset detection resistor is the resistor R_CC of the external charging plug, the voltage across the two ends of the preset detection resistor R_CC is as shown in formula (4) at the moment.

$$U\_CC = Vref \times R\_CC/(R3+R\_CC) \quad (4)$$

U_CC represents the voltage across the two ends of the preset detection resistor R_CC; Vref represents the reference voltage; R3 represents the resistance value of the resistor R3; and R_CC represents the resistance value of the preset detection resistor R_CC. Therefore, the resistance value of the resistor R_CC in the external charging plug can be obtained according to the voltage value across the two ends of the preset detection resistor R_CC, the resistance value of the detection resistor R3 and the reference voltage Vref (e.g., 5V), so that the connection state of the external charging plug and the connection confirm interface can be detected.

However, since the wake-up module 211 will influence the detection result of the detection module 213, that is, the positive electrode of the battery module 300 is connected with the detection connection point of the detection module 213 via the resistor R5 and the resistor R6 and is connected with the input of the reference voltage through the detection resistor R3, so that the voltage U_CC detected by the detection module 213 is inconsistent with the result of the formula (4), and thus the formula (4) is not applicable anymore.

Therefore, after the battery management system is activated, the control module 215 needs to control the switching module 214, namely the control module 215 outputs the preset function switching signal to the relay through the second input end of the relay to close the relay. The first input end of the relay is disconnected with the first output end of the relay when the relay is closed, and then the positive electrode of the battery module 300 is disconnected with the source of the MOS transistor Q3, no current flows by the resistor R5 and the resistor R6, the wake-up module 211 generates no influence on the detection result of the detection module 213 anymore at the moment, and thus the detection module 213 can work normally.

After the battery management system is activated, the wake-up module 211 has accomplished its work, so that the wake-up module 211 can be either in the normal working state or in the abnormal working state at the moment.

Figure 8:
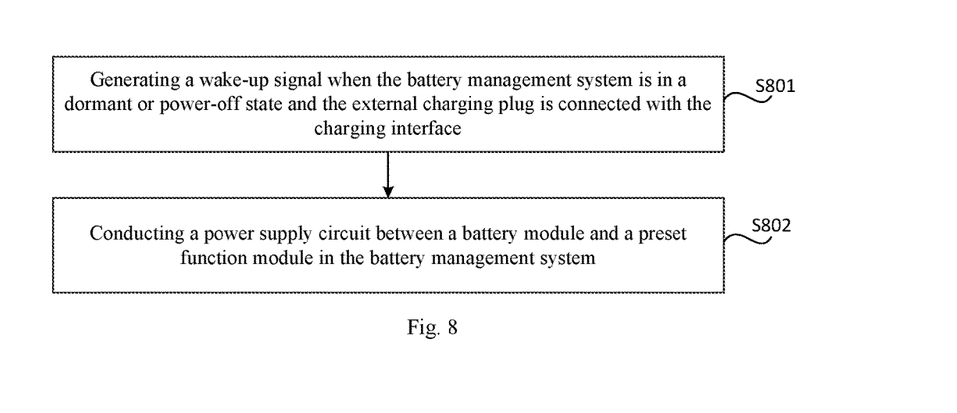
FIG. 8 is a flowchart of a method for charging wake-up shown according to an exemplary embodiment.

FIG. 8 is a flowchart of a method for charging wake-up shown according to an exemplary embodiment. Referring to FIG. 8, the method can include the following steps:

In step S801, a wake-up signal is generated when a battery management system is in a dormant or power-off state and an external charging plug is connected with a charging interface.

In step S802, a power supply circuit between a battery module and a preset function module in the battery management system is conducted according to the wake-up signal.

The wake-up signal is generated when the battery management system is in the power-off state and the external charging plug is plugged into the charging interface of an electric vehicle. After a power management module in the battery management system receives the wake-up signal, a battery module starts to supply power to the other function modules of the battery management system, and the battery management system is activated.

By means of the aforementioned technical solutions of the present invention, the battery management system is automatically woken up when the external charging plug is accessed to charge the vehicle, so the battery management system automatically enters the normal working state from the power-off state or the dormant state, and a user does not need to wake up the battery management system by way of ignition, thereby simplifying the charging process of the vehicle, facilitating the operation of the user and improving the user experience.

Figure 9:
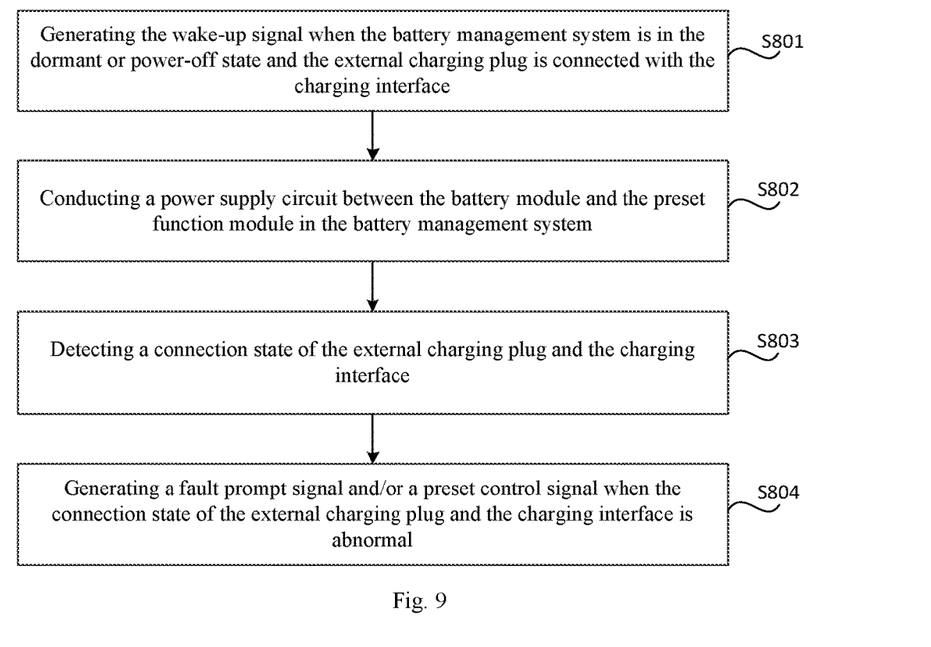
FIG. 9 is a flowchart of a method for charging wake-up shown according to another exemplary embodiment.

Referring to FIG. 9, in another embodiment of the present invention, the method for charging wake-up further includes:

In step S803, a connection state of the external charging plug and the charging interface is detected.

In step S804, a fault prompt signal and/or a preset control signal is generated when the connection state of the external charging plug and the charging interface is abnormal.

After the battery management system is woken up, the battery management system can detect the connection state of the external charging plug and the charging interface. In the embodiment of the present invention, the battery management system can immediately detect the connection state of the external charging plug and the charging interface after being woken up and can also carry out the detection at a preset time interval.

Figure 10:
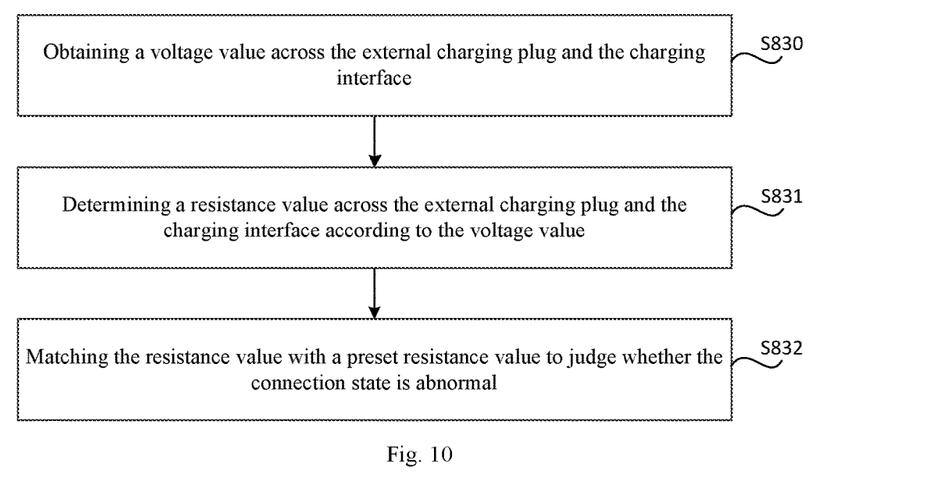
FIG. 10 is a flowchart of a method for charging wake-up shown according to another exemplary embodiment.

Referring to FIG. 10, in one embodiment of the present invention, the aforementioned step S803 includes:

In step S830, a voltage value across the external charging plug and the charging interface is obtained.

In step S831, a resistance value in the external charging plug is determined according to the voltage value.

In step S832, the resistance value is matched with a preset resistance value to judge whether the connection state is abnormal.

In one embodiment of the present invention, the detection of the connection state of the external charging plug can be realized by the voltage value of the charging interface. The resistance value introduced during the connection of the external charging plug is obtained by a preset algorithm based on the obtained voltage value of the charging interface. Since the resistance values in different external charging plugs for charging are different, and the resistance values (about 100Ω to 3.6 kΩ of all types of charging guns are preset in the control module of the battery management system, the connection state of the external charging plug can be obtained by matching the calculated resistance value with the preset resistance value. If the calculated resistance value is matched with the preset resistance value, the connection state of the external charging plug is normal; and on the contrary, the connection state of the external charging plug is abnormal.

In step S804, the fault prompt signal and/or the preset control signal is generated when the connection state of the external charging plug and the charging interface is abnormal.

By means of the aforementioned technical solutions, the battery module can detect the connection state of the external charging plug for charging after waking up the battery management system, and carries out prompting or other related operations when the connection state is abnormal so as to ensure the safety and the normal work of the vehicle.

Figure 11:
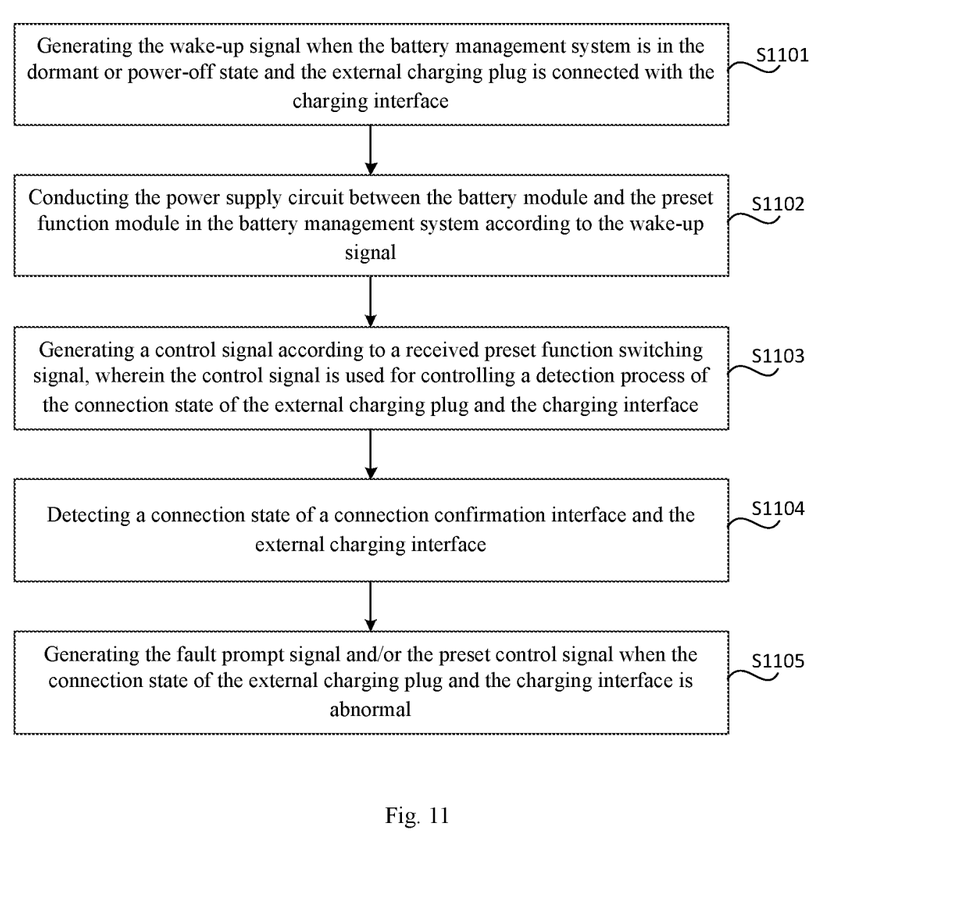
FIG. 11 is a flowchart of a method for charging wake-up shown according to another exemplary embodiment.

FIG. 11 is a flowchart of a method for charging wake-up shown according to another exemplary embodiment. Referring to FIG. 11, the method for charging wake-up includes:

In step S1101, a wake-up signal is generated when a battery management system is in a dormant or power-off state and an external charging plug is connected with a charging interface.

In step S1102, a power supply circuit between a battery module and a preset function module in the battery management system is conducted according to the wake-up signal.

In step S1103, a control signal is generated according to a received preset function switching signal, wherein the control signal is used for controlling a detection process of the connection state of the external charging plug and the charging interface.

After the battery management system is woken up, other circuits therein generate influence on the detection result of the connection state of the external charging plug and the charging interface, therefore, the switching signal is sent to the switching module in the battery management system before the connection state of the external charging plug is detected, so that the switching module can generate a signal for normally detecting the connection state of the external charging plug and the charging interface after receiving the switching signal. In this case, the influence of the other circuits on the connection state of the external charging plug and the charging interface can be eliminated, and an accurate detection result is obtained.

In step S1104, the connection state of the external charging plug and the charging interface is detected.

In step S1105, a fault prompt signal and/or a preset control signal is generated when the connection state of the external charging plug and the charging interface is abnormal.

By means of the aforementioned technical solutions, the switching signal is generated, and the signal used for keeping the detection function normal is generated before the connection state of the external charging plug is detected, therefore the influence of the other circuits in the battery management system on the detection result of the connection state of the external charging plug and the charging interface can be eliminated, and the accuracy of the detection result is improved.

Figure 12:
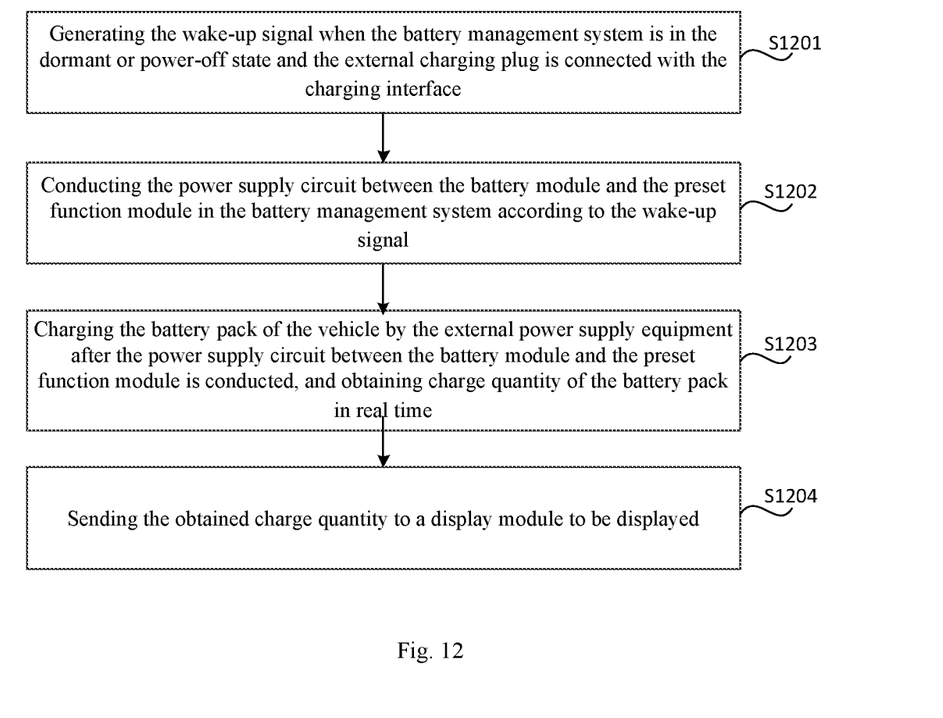
FIG. 12 is a flowchart of a method for charging wake-up shown according to another exemplary embodiment.

FIG. 12 is a flowchart of a method for charging wake-up shown according to another exemplary embodiment. Referring to FIG. 12, the method for charging wake-up includes:

In step S1201, a wake-up signal is generated when a battery management system is in a dormant or power-off state and an external charging plug is connected with a charging interface.

In step S1202, a power supply circuit between a battery module and a preset function module in the battery management system is conducted according to the wake-up signal.

In step S1203, The external power supply equipment charges a battery pack of the vehicle after the power supply circuit between the battery module and the preset function module is conducted, and the charge quantity of the battery pack is obtained in real time.

In step S1204, the charge quantity is sent to a display module to be displayed.

When the external power supply equipment charges the battery pack of the vehicle, the battery management system can obtain the charge quantity of the battery pack in real time and detect the charging state of the battery pack. Meanwhile, the obtained charge quantity can be sent to the display module of the vehicle to be displayed, so that the user can master the charging information of the battery pack in real time.

Figure 13:
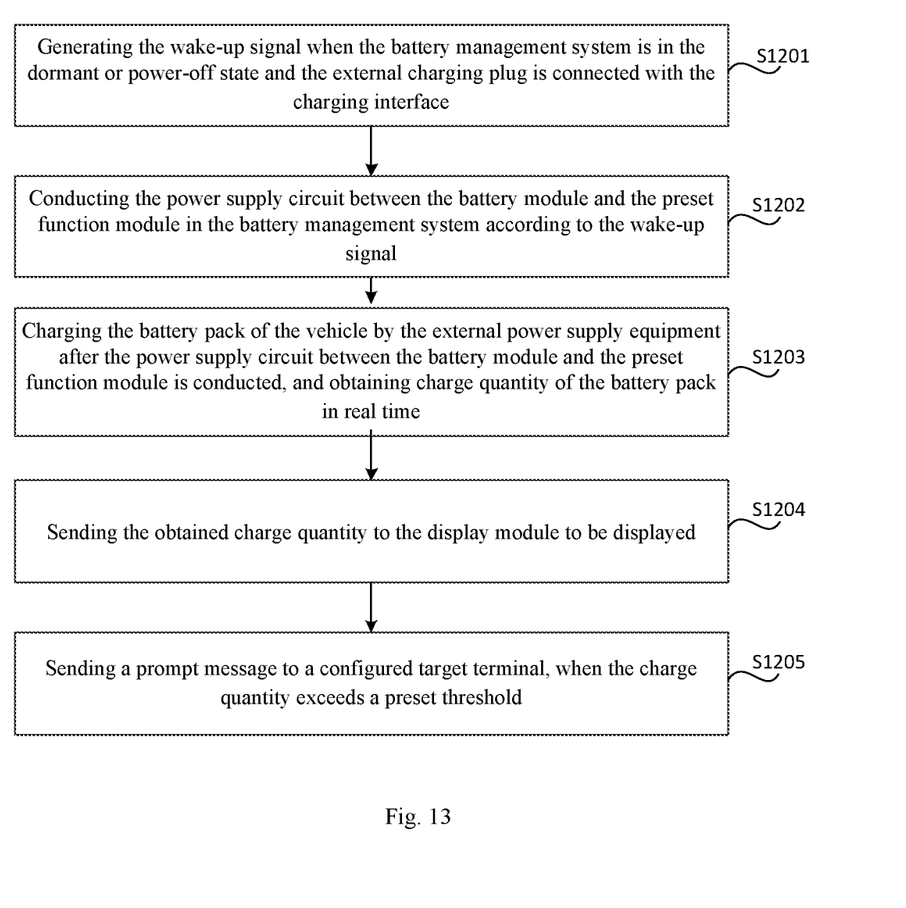
FIG. 13 is a flowchart of a method for charging wake-up shown according to another exemplary embodiment.

Optionally, referring to FIG. 13, in another embodiment, the aforementioned method for charging wake-up further includes:

In step S1025, a prompt message is sent to a configured target terminal, when the charge quantity exceeds a preset threshold.

There may be such an implementation scenario that, the user needs to leave for some reasons when the vehicle is parked to be charged, so the user cannot know the charging condition of the battery pack during the leaving time of the user, when the charge quantity of the battery pack reaches the total capacity of the battery pack, if the user fails to deal with the situation in time, the battery pack is prone to generate an overcharge situation, thus causing adverse effects to the battery pack.

Therefore, when the charge quantity of the battery pack is monitored, if the obtained charge quantity exceeds the preset threshold, the prompt message can be sent to the configured target terminal, such as a mobile phone, a tablet computer, an intelligent wearable device and other user terminals to notify the user of the current charging condition of the battery pack, so that the user can carry out corresponding arrangement. In one embodiment, the preset threshold can be set by the user according to the actual situation. For example, the user can set the preset threshold to be 80% of the total capacity of the battery pack.

By means of the aforementioned technical solutions of the present embodiment, the user can master the charging condition of the battery pack and make arrangement in time according to the charging condition, thereby avoiding the overcharge situation of the battery pack, optimizing the charging process of the battery pack and enhancing the user experience.

Figure 14:
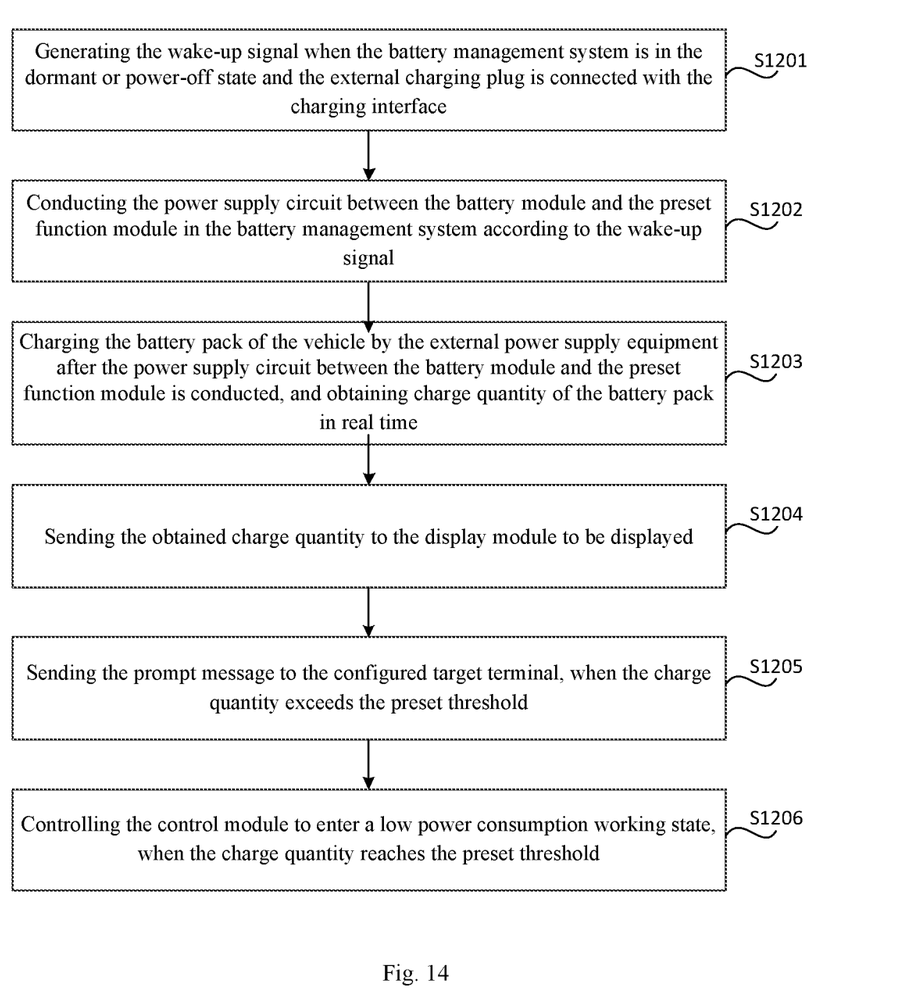
FIG. 14 is a flowchart of a method for charging wake-up shown according to another exemplary embodiment.

Optionally, referring to FIG. 14, in another embodiment, the aforementioned method for charging wake-up further includes:

In step 1206, the power control is controlled to enter a low power consumption working state, when the charge quantity reaches the preset electric quantity threshold.

The battery module supplies power to the battery management system during the charging process of the battery pack by the power supply equipment, so that the battery management system can work normally. Optionally, if the charge quantity obtained by the battery electric quantity management system exceeds the preset electric quantity threshold, the control module of the battery management system can be controlled to enter the low power consumption working state, for example, a part of input/output interfaces of the control module are closed or a part of running kernels of the control module are closed to reduce the power consumption of the battery management system on the battery module.

In one embodiment, the preset electric quantity threshold can be customized by the user according to the actual situation, for example, the preset electric quantity threshold can be the total capacity of the battery pack. According to the technical solutions of the present embodiment, the power consumption of the battery management system from the battery module can be reduced, and the service life of the battery module can be prolonged.

The preferred embodiments of the present invention have been described in detail in combination with the accompanying drawings, however, the present invention is not limited to the specific details in the aforementioned embodiments, and various simple variations can be made to the technical solutions of the present invention within the range of the technical concept of the present invention, and simple variations all fall within the protection scope of the present invention.

In addition, it should be noted that the specific technical features described in the aforementioned specific embodiments can be combined in any suitable manner without contradiction. In order to avoid unnecessary repetition, the present invention will not additionally illustrate various possible combinations.

In addition, various different embodiments of the present invention can also be randomly combined, and the combination should likewise be regarded as the contents disclosed by the present invention as long as they do not depart from the idea of the present invention.

The invention claimed is:

1. A battery management system, comprising:
    a wake-up module, configured to generate a wake-up signal when the battery management system is in one of a dormant and a power-off state and an external charging plug is connected with a charging interface; and
    a power management module, configured to conduct a power supply circuit between a battery module and a preset function module in the battery management system when receiving the wake-up signal.

2. The system of claim 1, further comprising:
    a detection module, configured to detect a connection state of the external charging plug and the charging interface; and
    a control module, configured to generate at least one of a fault prompt signal and a preset control signal when the connection state is abnormal.

3. The system of claim 2, wherein the detection module is further configured to:
    obtain a voltage value across the external charging plug and the charging interface; and
    the control module is configured to determine a resistance value across the external charging plug and the charging interface according to the voltage value, and to match the resistance value with a preset resistance value to judge whether the connection state is abnormal or not.

4. The system of claim 2, further comprising:
    a switching module, configured to generate a control signal when a preset function switching signal sent by the control module is received, wherein the control signal is configured to control a detection process of the detection module; and the control module is further configured to generate the preset function switching signal and to send the preset function switching signal to the switching module, when the power supply circuit between the battery module and the preset function module in the battery management system is conducted.

5. The system of claim 4, the wake-up module includes: a MOS transistor Q1, a resistor R1, a resistor R2 and a diode D1; a source of the MOS transistor Q1 is connected with a positive electrode of the battery module, a drain of the MOS transistor Q1 is connected with the power management module, and a gate of the MOS transistor Q1 is connected with the positive electrode of the diode D1 through the resistor R2; a negative electrode of the diode D1 is connected with the charging interface; and one end of the resistor R1 is respectively connected with the source of the MOS transistor Q1 and the positive electrode of the battery module, and the other end of the resistor R1 is connected with the gate of the MOS transistor Q1.

6. The system of claim 5, the switching module includes: a triode Q2 and a resistor R4; a base of the triode Q2 is connected with the control module, a collector of the triode Q2 is connected with the positive electrode of the diode D1, and an emitter of the triode Q2 is grounded; and one end of the resistor R4 is respectively connected with a switching signal source and the base of the triode Q2, and the other end of the resistor R4 is connected with the emitter of the triode Q2.

7. The system of claim 4, the switching module includes: a relay; and a first input end of the relay is connected with the positive electrode of the battery module, a second input end of the relay is connected with a switching signal source, a first output end of the relay is connected with the wake-up module, and a second output end of the relay is grounded.

8. The system of claim 7, the wake-up module includes: a MOS transistor Q3, a resistor R5 and a resistor R6; the source of the MOS transistor Q3 is connected with the first output end of the relay, the drain of the MOS transistor Q3 is connected with the power management module, and the gate of the MOS transistor Q3 is connected with the charging interface through the resistor R6; and one end of the resistor R5 is respectively connected with the first output end of the relay and the source of the MOS transistor Q3, and the other end of the resistor R5 is connected with the gate of the MOS transistor Q3.

9. A vehicle, comprising a battery management system, wherein the battery management system comprises:

a wake-up module, configured to generate a wake-up signal when the battery management system is in one of a dormant and a power-off state and an external charging plug is connected with a charging interface; and a power management module, configured to conduct a power supply circuit between a battery module and a preset function module in the battery management system when receiving the wake-up signal.

10. A method for charging awakening, comprising:

generating a wake-up signal when a battery management system is in one of a dormant and a power-off state and an external charging plug is connected with a charging interface; and conducting a power supply circuit between a battery module and a preset function module in the battery management system according to the wake-up signal.

11. The method of claim 10, further comprising:

generating a control signal according to a received preset function switching signal, wherein the control signal is configured to control a detection process of the connection state of the external charging plug and the charging interface.

12. The method of claim 10, further comprising:

obtaining charge quantity of the battery pack in real time, when the power supply circuit between the battery module and the preset function module is conducted and external power supply equipment charges a battery pack of a vehicle; and sending the charge quantity to a display module to be displayed.

13. The method of claim 12, further comprising:

sending a prompt message to a configured target terminal, when the charge quantity exceeds a preset threshold.

14. The method of claim 12, further comprising:

controlling the control module to enter a low power consumption working state, when the charge quantity reaches a preset electric quantity threshold.

* * * * *